United States Patent

[11] 3,607,429

[72] Inventors Meer Danilovich Kocherginsky
ulitsa Komarova 6, kv. 23;
Lidia Fedorovna Penkova, 3
Mytischinskaya ulitsa, 14-a, kv. 124;
Viktor Arsenievich Naumenko,
Novoslobodskaya ulitsa, 62, kv. 64; Sergei
Leonidovich Kalachev, St. Traininskaya, 1
Kalininsky pereulok, 6-a, all of Moscow,
U.S.S.R.
[21] Appl. No. 770,545
[22] Filed Oct. 25, 1968
[45] Patented Sept. 21, 1971
[32] Priority Dec. 29, 1967
[33] U.S.S.R.
[31] 1205879

[54] GALVANIC BATTERY
7 Claims, 6 Drawing Figs.
[52] U.S. Cl. .................................. 136/107,
136/111, 136/132, 136/166
[51] Int. Cl. .................................. H01m 21/00
[50] Field of Search ........................ 136/132,
147, 111, 107, 125, 126, 130, 102, 166, 6, 30, 3,
134, 135

[56] References Cited
UNITED STATES PATENTS

| | | | |
|---|---|---|---|
| 1,277,147 | 8/1918 | Armande | 136/132 |
| 2,200,862 | 5/1940 | Redfern | 136/107 |
| 2,480,839 | 9/1949 | Daniel | 136/107 |
| 2,519,054 | 8/1950 | Woodring | 136/111 |
| 2,713,602 | 7/1955 | Shuman, Jr. | 136/111 |
| 2,861,117 | 11/1958 | Sindel | 136/111 |
| 3,060,256 | 10/1962 | Paulson | 136/103 |
| 3,156,585 | 11/1964 | Yamano, et al. | 136/6 |
| 3,278,339 | 10/1966 | Reilly et al. | 136/107 |
| 3,418,172 | 12/1968 | Fletcher | 136/111 |

Primary Examiner—Winston A. Douglas
Assistant Examiner—A. Skapars
Attorney—Waters, Roditi, Schwartz & Nissen ABSTRACT: A galvanic battery, e.g. a flashlight battery, consisting of alkaline manganese dioxide-zinc cells, wherein each cell includes two shells forming a plastic casing and current collectors, the casing accommodating two zinc powder negative electrodes disposed on both sides of a positive electrode and separated therefrom by diaphragms. In each shell of the cell casing provision is made on the edge periphery for extensions which form a lap joint when assembling the cell. The cells assembled in banks are placed in a hermetic plastic film bag contained within a cellulosic outer casing of the galvanic battery.

PATENTED SEP 21 1971 3,607,429
SHEET 1 OF 2
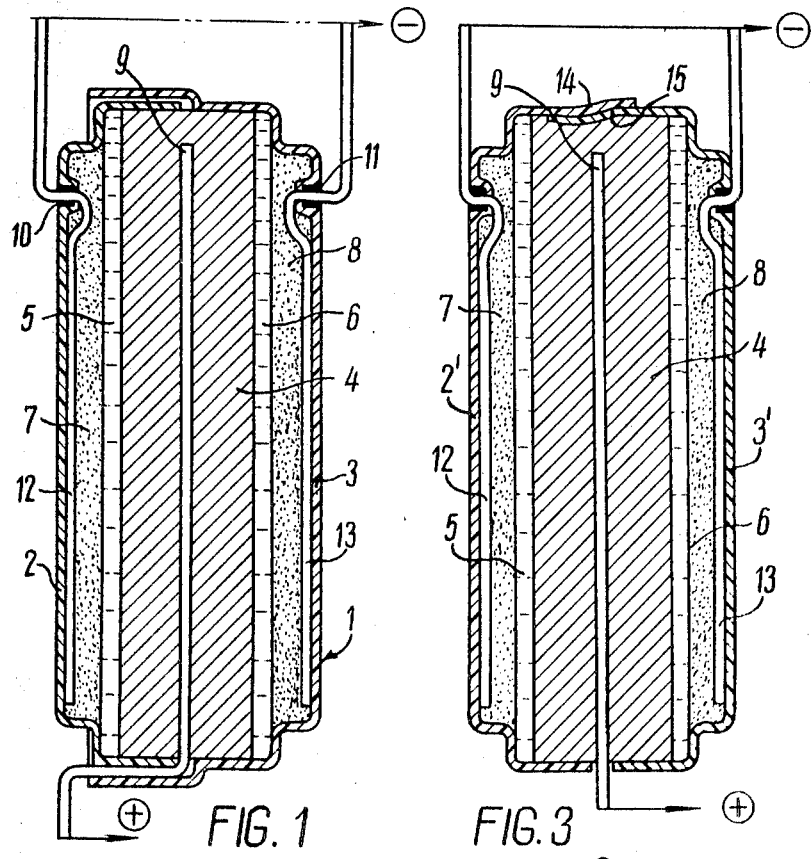
FIG. 1
FIG. 3
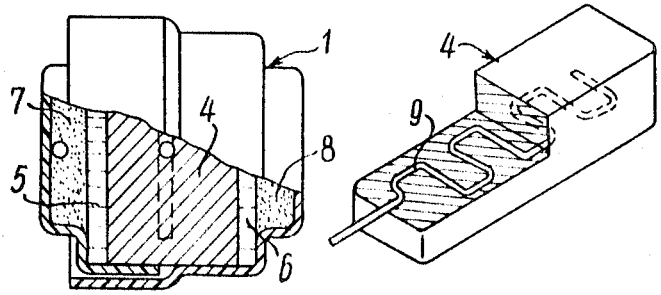
FIG. 2
FIG. 4

3,607,429

GALVANIC BATTERY

This invention relates to galvanic batteries.

The prior art includes galvanic batteries, e.g. flashlight batteries, consisting of alkaline manganese dioxide-zinc cells, wherein each cell, includes a plastic casing with current collectors which accommodates a manganese dioxide cathode, a separator disposed on one side of the cathode, and a zinc pressed-powder anode.

These galvanic batteries show a marked decrease in capacity under high drain conditions. Another disadvantage of such galvanic batteries is that the electrolyte and carbonates tend to leak to the battery surface during long-term storage and discharge of the batteries.

It is an object of the present invention to eliminate the aforementioned disadvantages.

It is another object of the present invention to provide a galvanic battery of high electrical capacity which will withstand long-term storage and will be relatively inexpensive in large-scale production.

In accordance with the principles of the present invention, these objects are accomplished by providing a galvanic battery, e.g. a flashlight battery, consisting of alkaline manganese dioxide-zinc cells, wherein each cell includes a plastic casing with current collectors which accommodates a cathode, two diaphragms disposed on both sides of the cathode, and two zinc powder anodes separated from the cathode by the diaphragms, the cell casing being made in the form of two shells within which the three electrodes are disposed.

As a feature of the present invention, each shell has provision on its edge periphery for an extension for insulating the negative and the positive current collectors from each other by forming a lap joint from the edge extensions of both shells when assembling the cell. Additionally, a bank of assembled cells are housed in a hermetic plastic bag to be contained within a cellulosic outer casing.

In the present galvanic battery the electrodes' surface areas are twice as great as that of the known batteries and the discharge current will be correspondingly higher. When discharged across 15 ohms during 10 minutes daily until the cutoff voltage equals 2.25 V., as stipulated by the Tentative Standard of the International Electrotechnical Commission, the flashlight batteries, according to the present invention, have an operational life of 1,200 minutes and outperform in this respect sal-ammoniac batteries for flashlights by a factor of five (the standard operational life of flashlight batteries should equal 210 minutes in compliance with the International Electrotechnical Commission's requirements).

The present invention is illustrated hereinbelow by the description of exemplary embodiments thereof with reference to the accompanying drawings, wherein:

FIG. 1 is a cross-sectional view of a galvanic battery cell in which the cell casing is made of two shells of dissimilar size, according to the invention;

FIG. 2 is the plan view of the cell of FIG. 1;

FIG. 3 is a cross-sectional view of a galvanic battery cell in which the cell casing is made of two shells of identical size, according to the invention;

Figure 5:
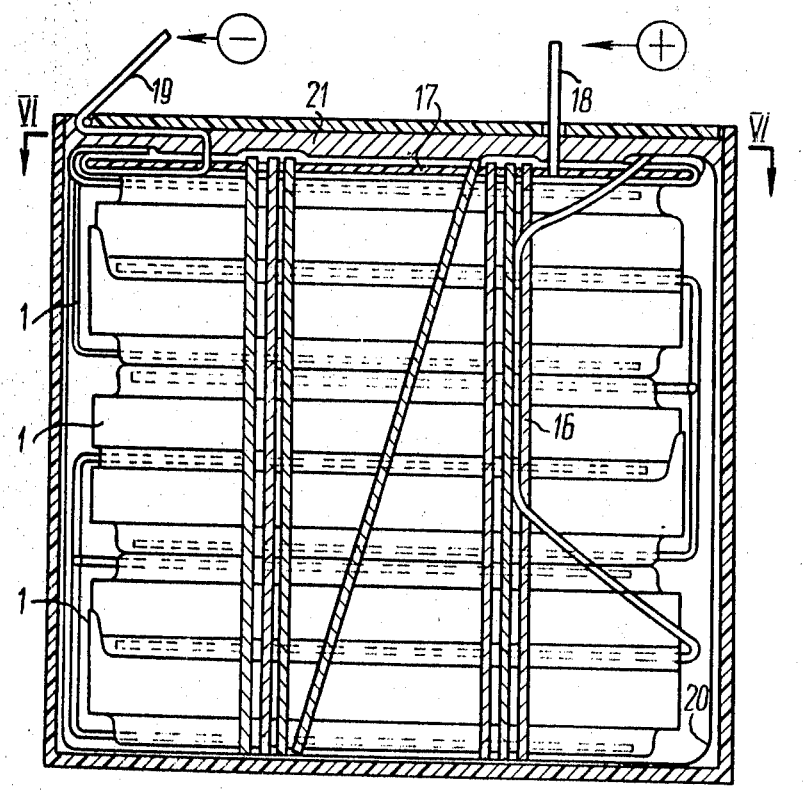
Figure 6:
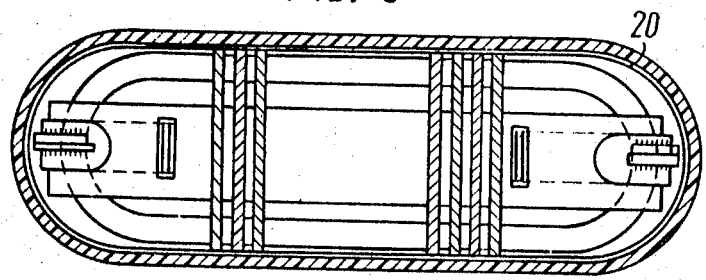

FIG. 4 presents one possible form of the cathode;

FIG. 5 shows in section an assembled galvanic battery, according to the invention, and FIG. 6 is the plan view of the battery of FIG. 5.

An alkaline manganese dioxide-zinc cell 1 (FIGS. 1 and 2) of the galvanic battery is housed in a casing consisting of first and second shells 2 and 3 of dissimilar size, provision being made for an improved hermetic seal for the casing by allowing shell 2 to partially enter or overlap shell 3.

Disposed inside the casing are a cathode 4, diaphragms 5 and 6 and zinc powder anodes 7 and 8 adjoining to and separated by the diaphragms from both sides of the cathode. A positive current collector or terminal 9 is pressed into cathode 4, while negative current collectors or terminals 12 and 13 connected to anodes 7 and 8 are brought out of the cell casing via openings 10 and 11 in shells 2 and 3.

To seal openings 10 and 11, an insulating composition is used, provision also being made to insulate negative current collectors 12 and 13.

Shown in FIG. 3 is the alkaline manganese dioxide-zinc cell 1, which is contained in a casing in the form of two shells 2' and 3' of identical size. In this instance, the entire galvanic battery is made of identical shells 2' and 3', which simplifies the process of assembling the galvanic batteries and diminishes the production cost.

To prevent cathode 4 from contacting negative current collectors 12 and 13, in shells 2' and 3' provision is made on the edge periphery for extensions 14 and 15 which extensions form a lap joint when assembling cell 1 and eliminate the need to employ additional casing components for insulating negative current collectors 12 and 13.

FIG. 4 shows one possible form of cathode 4, which is rectangular and contains a wire helix serving as positive current collector 9.

Alkaline manganese dioxide-zinc cells 1 are assembled in banks (FIGS. 5 and 6) by placing cells 1 one above another and using a binding band 16 to tie the cells together to panel 17 to which are secured positive and negative current collectors 18 and 19.

In each cell 1 negative current collectors 12 and 13 should be connected in pairs and also joined to positive current collector 9 of an adjacent cell. The connection of current collectors is effected by twisting together or welding appropriate current collectors.

The terminal current collectors in a bank of cells are soldered or welded to appropriate current collectors 18 and 19 of the galvanic battery.

In order to eliminate galvanic battery shorting by current collectors leading from cells 1 disposed in the bottom part of a bank, the current collectors pass under binding band 16 and a thin insulating coating is applied thereto. A bank of cells 1 is placed in an insulating plastic bag 20, e.g. a polyethylene film, which is sealed except for apertures through which current collectors 18 and 19 pass. Next the assembled banks of cells 1 are inserted into an outer casing made, for example, from paper and the apertures through which current collectors 18 and 19 emerge from the plastic bag are sealed with an insulating composition 21.

I claim:

1. A galvanic battery comprising alkaline manganese dioxide-zinc cells, a plastic casing, said plastic casing having a first and a second shell, said first and second shells forming said casing and having projecting members, said projecting member of said first shell overlapping said projecting member of said second shell when said casing is assembled, at least two zinc powder anodes, a cathode, diaphragms, and current collectors pressed into said anodes and cathode, said diaphragms separating said anodes from said cathodes, and said anodes, cathodes and diaphragms being housed within said casing, and said current collectors extending out of the cell.

2. A galvanic battery as claimed in claim 1, wherein said overlapping projecting members of said first and second shells form a lap joint when said casing is assembled.

3. A galvanic battery as claimed in claim 1, wherein said projecting members are located at the tops of said first and second shells.

4. A galvanic battery as claimed in claim 1, wherein each battery forms an elementary cell and a plurality of said elementary cells are assembled together to form a bank of elementary cells, a hermetic plastic film bag, and a cellulosic outer casing, said outer casing enclosing said film bag, said film bag enclosing said bank of elementary cells.

5. A galvanic battery as claimed in claim 2, wherein each battery forms an elementary cell and a plurality of said elementary cells are assembled together to form a bank of elementary cells, a hermetic plastic film bag, and a cellulosic outer casing, said outer casing enclosing said film bag, said film bag enclosing said bank of elementary cells.

6. A galvanic battery as claimed in claim 1, wherein said first and second shells are of unequal size.

7. A galvanic battery as claimed in claim 2, wherein said first and second shells are equal in size.